July 15, 1952     I. PAULSEN     2,603,432
HOSE GUIDE
Filed Jan. 17, 1951     2 SHEETS—SHEET 1
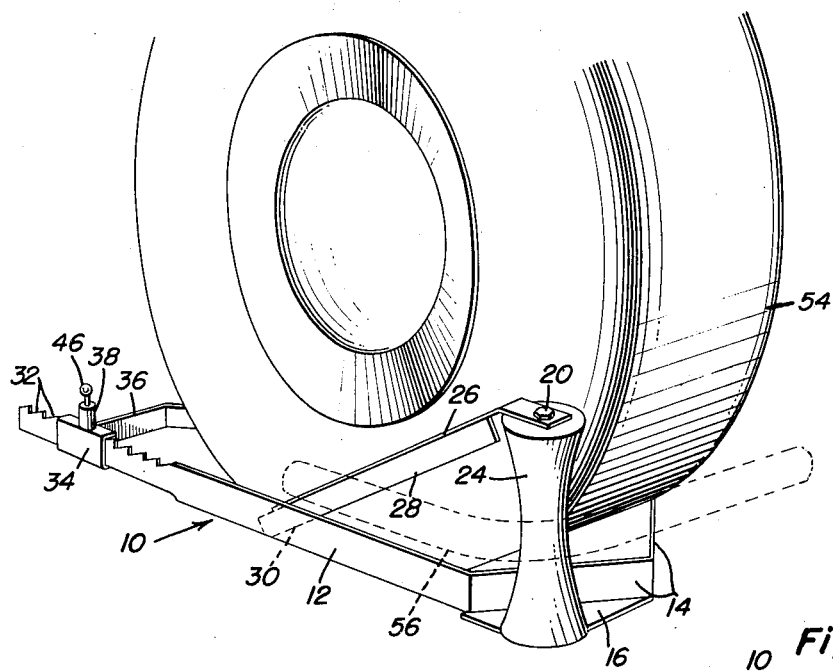
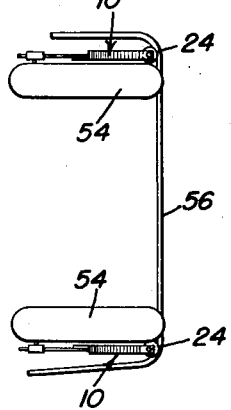
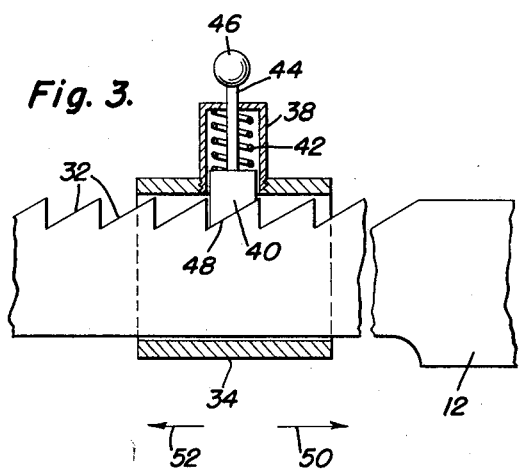
Ingomar Paulsen
INVENTOR.

July 15, 1952   I. PAULSEN   2,603,432
HOSE GUIDE

Filed Jan. 17, 1951   2 SHEETS—SHEET 2

Ingomar Paulsen
*INVENTOR.*

BY *Clarence A. O'Brien
and Harvey B. Jacobson*
Attorneys

Patented July 15, 1952

2,603,432

UNITED STATES PATENT OFFICE 2,603,432

HOSE GUIDE

Ingomar Paulsen, Fontana, Calif., assignor of fifty per cent to Robert Ritchie, Fontana, Calif.

Application January 17, 1951, Serial No. 206,490

2 Claims. (Cl. 242—157)

This invention relates to new and useful improvements and structural refinements in hose guides, and the principal object of the invention is to provide a device of the character herein described, which may be conveniently and effectively employed for sustaining water, air or spray-painting hoses out of engagement with tires of automobiles and other vehicles.

For example, while an automobile is being spray painted, the air hose extending from a supply of compressed air to the spray gun frequently binds between the automobile tires and the ground and floor on which they stand, thus requiring the painter or his assistant to frequently free the hose from the tire, and correspondingly delaying and impairing the progress of the painting operation.

The above disadvantages are eliminated by the provision of the instant invention which is adapted to be placed at the bottom of the tire and is provided with a rotatable roller which functions in the nature of a guide for sustaining the hose out of engagement with the tire and, thereby, preventing the hose from becoming lodged between the tire and the supporting surface. Moreover, the rotatable roller of this invention is so located that the hose is prevented from rubbing against the side wall of the tire, thus avoiding any possibility of damage to the tire and to the hose itself.

Some of the advantages of the invention reside in its extreme simplicity of construction, in its efficient and dependable operation, in its adaptability for use with tires of different sizes, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention applied to a tire;

Figure 3 is a fragmentary sectional detail, taken substantially in the plane of the line 3—3 in Figure 2;

Like characters of reference are employed to designate like parts in the specification and throughout the several views.

Figure 2:
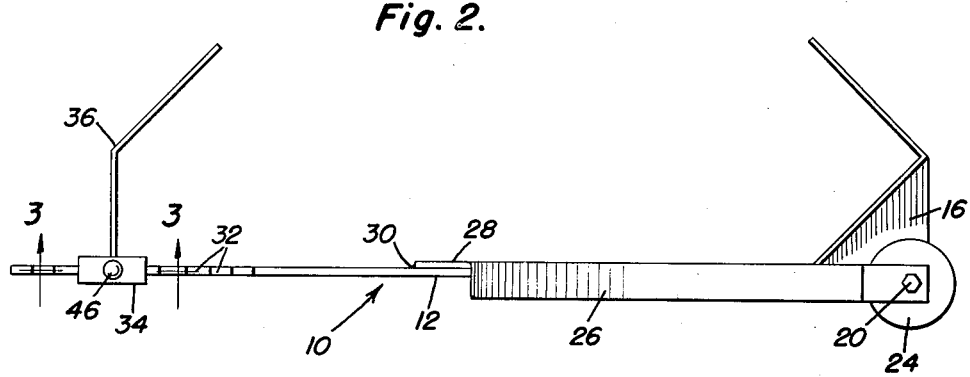
Figure 2 is a side elevational view of the invention per se.
Figure 4:
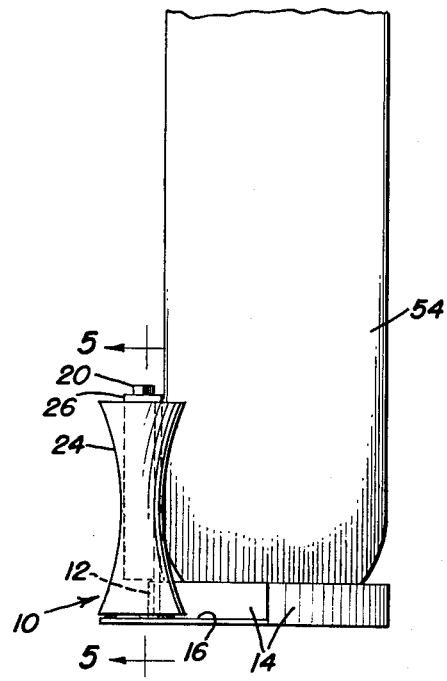
Figure 4 is a front elevational view of the subject shown in Figure 1.
Figure 5:
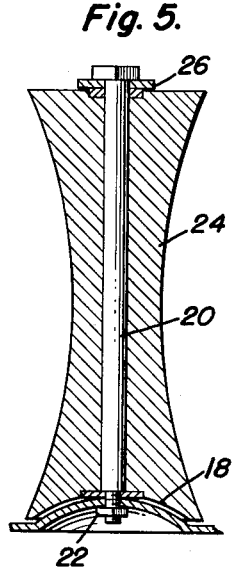
Figure 5 is a fragmentary sectional detail, taken substantially in the plane of the line 5—5 in Figure 4; and, Figure 6 is a diagrammatic top plan view illustrating two of the devices applied, respectively, to two wheels of a vehicle and showing a hose passing freely around the same.

Referring now to the accompanying drawings in detail, the invention consists of a hose guide which is designated generally by the reference character 10 and embodies in its construction an elongated frame 12 which preferably assumes the form of a flat bar, standing on edge, so to speak, one end portion of this bar being angulated so as to provide a substantially V-shaped stationary tire engaging member 14.

A substantially triangular platform 16 is secured by welding, or the like, to the frame 12 at the outside of the member 14, the platform 16 being equipped with a convex portion 18 to support a vertical stud 20 which is secured to the platform portion 18 by a nut 22.

A concave roller 24 is rotatably positioned on the stud 20, and a reinforcing strap 26, provided with a flange 28, extends from the upper end of the stud 20 and is secured to the frame 12 as at 30, (by welding or the like) so as to properly support the stud 20 on the platform 16.

The free end portion of the frame 12 is provided with a set of ratchet teeth 32 and a hollow block 34 is slidable on this toothed portion of the frame, the block 34 having secured thereto an angular tire engaging member 36, configurated as is best shown in Figure 2.

The block 34 is provided at the top thereof with a cylindrical socket 38 in which is slidable a locking dog 40, the latter being urged in engagement with the teeth 32 by a compression spring 42 in the socket 38, while a stem 44, secured to the dog 40, projects upwardly from the socket and carries a hand knob 46.

It will be apparent from the foregoing that since the locking dog 40 has an inclined lower surface 48 which corresponds to the inclination of the ratchet teeth 32, the block 34 may be freely slid in the direction of the arrow 50 so as to draw the tire engaging member 36 toward the stationary member 14, during which action the dog 40 will simply jump or skip over the teeth 32, under the control of the spring 42. However, the member 36 cannot be shifted away from the member 14 by attempting to slide the block 34 in the direction of the arrow 52 until such time as the knob 46 is pulled upwardly to disengage the dog 40 from the teeth 32.

When the invention is placed in use, the entire device is applied to the bottom of a tire 54 so that the stationary member 14 engages the tire at the front and the block 34 is shifted on the frame 12 so that the member 36 engages the tire at the rear, thereby sustaining the device in position. Of course, the entire device rests upon the surface which supports the tire, such as the ground or floor, and it will be noted that when a flexible hose 56 is engaged with the roller 24, the hose will be substantially spaced away from the tire and binding of the hose between the tire and the supporting surface will be prevented.

The device may be applied to front as well as rear tires and when, as shown in Figure 6, the hose 56 is to be guided around two tires at the opposite sides of a vehicle, two devices may be employed, one for each tire, the two devices being of opposite hands, so to speak, in order that the hose guiding roller 24 of each device is disposed at the outside of the wheel, as shown.

Since the hose guiding roller 24 is disposed laterally as well as forwardly from the point of contact of the tire with its supporting surface, the invention will not only prevent binding of the hose under the tire, but it will also sustain the hose from sliding contact with the tire side wall.

Finally, it will be noted that by virtue of the tire engaging members 14, 36 and by virtue of the adjustability of the member 36 with respect to the member 14, as facilitated by the sliding block 34, the invention will accommodate tires of different sizes.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. In a hose guide of the character described, the combination of an elongated frame adapted to be positioned at the bottom of a vehicle tire and including a bar having one end portion thereof angulated to provide a substantially V-shaped stationary tire engaging member, a platform secured to said bar at the outside of said V-shaped stationary member, a block slidable longitudinally on the other end portion of said bar, an adjustable tire engaging member secured to said block and slidable therewith, means for locking said block against sliding away from said stationary member, and a substantially vertical hose engaging roller rotatably mounted on said platform, whereby a hose passing around said roller may be sustained in spaced relation from the stated tire.

2. The device as defined in claim 1 wherein said means comprise a row of ratchet teeth provided on said bar, and a spring-pressed locking dog provided on said block and engaging said teeth.

INGOMAR PAULSEN.

REFERENCES CITED

The following references are of record in the file of this patent:

UNITED STATES PATENTS

| Number | Name | Date |
| --- | --- | --- |
| 1,188,538 | Greene et al. | June 27, 1916 |
| 1,525,837 | Walker et al. | Feb. 10, 1925 |